(12) United States Patent
Yamamoto

(10) Patent No.: US 11,850,990 B2
(45) Date of Patent: Dec. 26, 2023

(54) INFORMATION PROCESSING APPARATUS, INFORMATION PROCESSING METHOD, PHOTOGRAPHING APPARATUS, LIGHTING APPARATUS, AND MOBILE BODY

(71) Applicant: Sony Corporation, Tokyo (JP)

(72) Inventor: Keitaro Yamamoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 402 days.

(21) Appl. No.: 17/054,784

(22) PCT Filed: May 10, 2019

(86) PCT No.: PCT/JP2019/018676
§ 371 (c)(1),
(2) Date: Nov. 12, 2020

(87) PCT Pub. No.: WO2019/225349
PCT Pub. Date: Nov. 28, 2019

(65) Prior Publication Data
US 2021/0232842 A1    Jul. 29, 2021

(30) Foreign Application Priority Data
May 24, 2018   (JP) ................................ 2018-099296

(51) Int. Cl.
*G06V 10/141*     (2022.01)
*G06V 20/56*      (2022.01)
(Continued)

(52) U.S. Cl.
CPC ....... *B60Q 1/0017* (2013.01); *G06F 18/2163* (2023.01); *G06F 18/251* (2023.01);
(Continued)

(58) Field of Classification Search
CPC ..... G06V 10/141; G06V 10/993; G06V 20/56
See application file for complete search history.

(56) References Cited

U.S. PATENT DOCUMENTS

| 2013/0258689 A1* | 10/2013 | Takahira | ............... F21S 41/151 |
| | | | 362/465 |
| 2017/0083775 A1 | 3/2017 | Grauer | |
| 2017/0341645 A1* | 11/2017 | Sugita | ....................... G06T 7/70 |

FOREIGN PATENT DOCUMENTS

| EP | 2127944 A1 | 12/2009 | |
| EP | 3067826 A1 * | 9/2016 | ............. B60Q 1/143 |

(Continued)

OTHER PUBLICATIONS

International Search Report and Written Opinion dated Jul. 23, 2019 for PCT/JP2019/018676 filed on May 10, 2019, 11 pages including English Translation of the International Search Report.

*Primary Examiner* — Jeffery A Williams
(74) *Attorney, Agent, or Firm* — XSENSUS LLP

(57) ABSTRACT

The present technique relates to an information processing apparatus, an information processing method, a photographing apparatus, a lighting apparatus, and a mobile body which enable accuracy of image recognition processing to be improved.

The information processing apparatus includes: a recognizing portion configured to perform image recognition processing with respect to an image photographed by a photographing portion and calculate, for each recognized area being an area based on a recognition result of an object, a reliability of the recognition result; and an irradiation control portion configured to control an irradiation pattern of visible light in a photographing direction of the photographing portion so that the reliability with respect to at least a part of the recognized areas increases. For example, the present technique can be applied to a vehicle control apparatus.

19 Claims, 8 Drawing Sheets

(51) Int. Cl.
  B60Q 1/00 (2006.01)
  G06F 18/25 (2023.01)
  G06F 18/21 (2023.01)
  H04N 23/74 (2023.01)
  G06V 20/58 (2022.01)
  B60Q 1/14 (2006.01)
  H04N 23/90 (2023.01)

(52) U.S. Cl.
  CPC ............ G06V 10/141 (2022.01); G06V 20/56 (2022.01); G06V 20/58 (2022.01); H04N 23/74 (2023.01); B60Q 1/0023 (2013.01); B60Q 1/1423 (2013.01); B60Q 2300/056 (2013.01); H04N 23/90 (2023.01)

(56) References Cited

FOREIGN PATENT DOCUMENTS

| | | | |
|---|---|---|---|
| JP | 2008-143505 | A | 6/2008 |
| JP | 2013-511418 | A | 4/2013 |
| JP | 2013-232390 | A | 11/2013 |
| JP | 2016-169001 | A | 9/2016 |
| JP | 2017-211909 | A | 11/2017 |
| JP | 2018-69800 | A | 5/2018 |
| JP | 2018069800 | A * | 5/2018 |

* cited by examiner

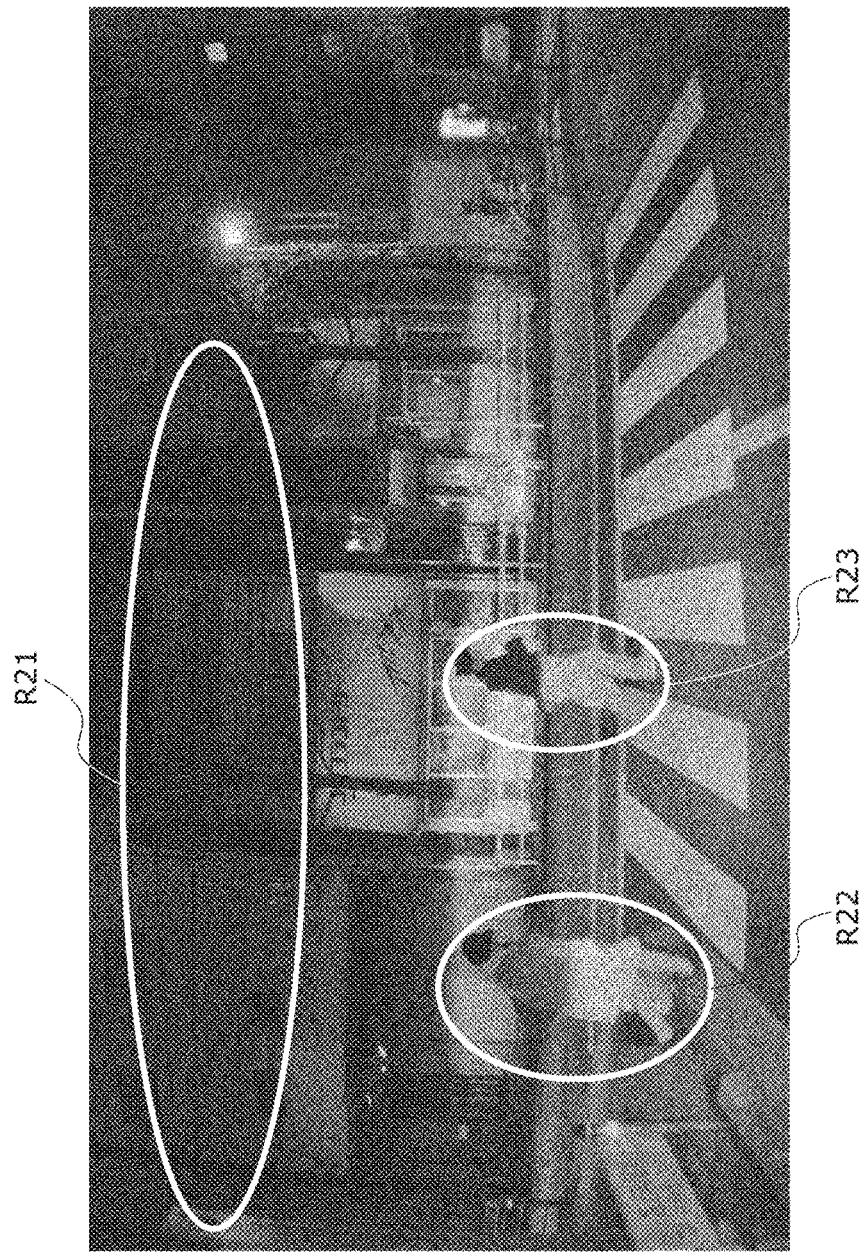

INFORMATION PROCESSING APPARATUS, INFORMATION PROCESSING METHOD, PHOTOGRAPHING APPARATUS, LIGHTING APPARATUS, AND MOBILE BODY

CROSS-REFERENCE TO RELATED APPLICATIONS

The present application is based on PCT filing PCT/JP2019/018676, filed May 10, 2019, which claims priority to JP 2018-099296, filed May 24, 2018, the entire contents of each are incorporated herein by reference.

TECHNICAL FIELD

The present technique relates to an information processing apparatus, an information processing method, a photographing apparatus, a lighting apparatus, and a mobile body and, particularly, to an information processing apparatus, an information processing method, a photographing apparatus, a lighting apparatus, and a mobile body which are suitably used when performing image recognition processing with respect to a visible image.

BACKGROUND ART

Conventionally, controlling a light distribution pattern of a headlamp apparatus based on a detection result of a road user in front of a vehicle to prevent the road user from being dazzled is proposed (for example, refer to PTL 1).

CITATION LIST

Patent Literature

PTL 1

Japanese Translation of PCT Application No. 2013-511418

SUMMARY

Technical Problem

In a visible image obtained by photographing surroundings of a vehicle by a visible light camera in a dark environment such as night-time, noise or blur increases in an area where illuminance of irradiated light from the vehicle is low or saturation of pixels occur in an area where the illuminance of the irradiated light is high. As a result, accuracy of image recognition processing with respect to the visible image declines and, for example, detection accuracy of objects around the vehicle declines.

In this regard, PTL 1 fails to consider controlling a light distribution pattern of a headlamp apparatus for the purpose of improving accuracy of image recognition processing.

The present technique has been devised in consideration of the circumstances described above and an object thereof is to improve accuracy of image recognition processing.

Solution to Problem

An information processing apparatus according to a first aspect of the present technique includes: a recognizing portion configured to perform image recognition processing with respect to an image photographed by a photographing portion and calculate, for each recognized area being an area based on a recognition result of an object, a reliability of the recognition result; and an irradiation control portion configured to control an irradiation pattern of visible light in a photographing direction of the photographing portion so that the reliability with respect to at least a part of the recognized areas increases.

An information processing method according to a second aspect of the present technique includes: performing image recognition processing with respect to an image photographed by a photographing portion and calculating, for each recognized area being an area based on a recognition result of an object, a reliability of the recognition result; and controlling an irradiation pattern of visible light in a photographing direction of the photographing portion so that the reliability with respect to at least a part of the recognized areas increases.

A photographing apparatus according to a third aspect of the present technique includes: an imaging element; a recognizing portion configured to perform image recognition processing with respect to an image photographed by the imaging element and calculate, for each recognized area being an area based on a recognition result of an object, a reliability of the recognition result; and an irradiation control portion configured to control an irradiation pattern of visible light in a photographing direction of the imaging element so that the reliability with respect to at least a part of the recognized areas increases.

A lighting apparatus according to a fourth aspect of the present technique includes: a light source portion; a recognizing portion configured to perform image recognition processing with respect to an image photographed by a photographing portion and calculate, for each recognized area being an area based on a recognition result of an object, a reliability of the recognition result; and an irradiation control portion configured to control an irradiation pattern of visible light due to the light source portion in a photographing direction of the photographing portion so that the reliability with respect to at least a part of the recognized areas increases.

A mobile body according to a fifth aspect of the present technique includes: a photographing portion; a lighting portion configured to irradiate visible light in a photographing direction of the photographing portion; a recognizing portion configured to perform image recognition processing with respect to an image photographed by the photographing portion and calculate, for each recognized area being an area based on a recognition result of an object, a reliability of the recognition result; and an irradiation control portion configured to control an irradiation pattern of visible light of the lighting portion so that the reliability with respect to at least a part of the recognized areas increases.

In the first to fifth aspects of the present technique, image recognition processing is performed, for each recognized area being an area based on a recognition result of an object, a reliability of the recognition result is calculated, and an irradiation pattern of visible light in a photographing direction is controlled so that the reliability with respect to at least a part of the recognized areas increases.

Advantageous Effects of Invention

According to the first to fifth aspects of the present technique, accuracy of image recognition processing can be improved.

It should be noted that the advantageous effects described above are not necessarily restrictive and any of the advantageous effects described in the present disclosure may apply.

BRIEF DESCRIPTION OF DRAWINGS

FIG. 8 is a diagram for explaining a control method of an irradiation pattern.

DESCRIPTION OF EMBODIMENTS

Hereinafter, modes for implementing the present technique will be described.

The descriptions will be given in the following order.
1. Embodiment
2. Modifications
3. Other

1. Embodiment

<Configuration Example of Vehicle 101>

Figure 1:
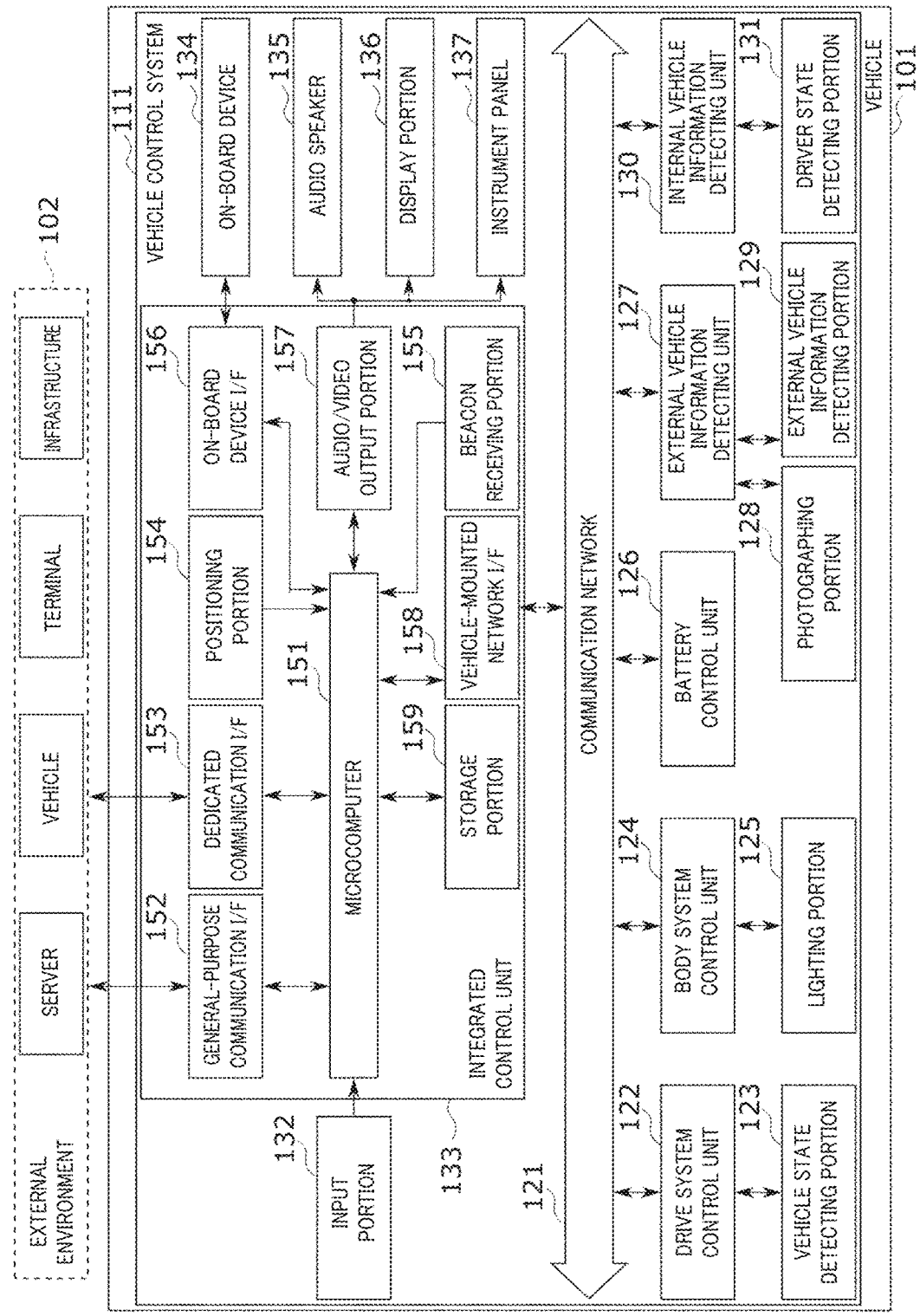
FIG. 1 is a block diagram showing a configuration example of a vehicle to which the present technique has been applied.

FIG. 1 is a block diagram showing a schematic configuration example of a vehicle 101 to which the present technique has been applied.

The vehicle 101 includes a vehicle control system 111.

The vehicle control system 111 includes a plurality of control units that are connected via a communication network 121. In the example shown in FIG. 1, the vehicle control system 111 includes a drive system control unit 122, a body system control unit 124, a battery control unit 126, an external vehicle information detecting unit 127, an internal vehicle information detecting unit 130, and an integrated control unit 133. The communication network 121 that connects the plurality of control units may be a vehicle-mounted communication network compliant with an arbitrary standard such as a CAN (Controller Area Network), a LIN (Local Interconnect Network), a LAN (Local Area Network), or FlexRay (registered trademark).

Each control unit includes a microcomputer that performs arithmetic processing in accordance with various programs, a storage portion that stores programs to be executed by the microcomputer, parameters to be used in various calculations, and the like, and a drive circuit that drives various apparatuses which are control targets. Each control unit includes a network I/F for communicating with other control units via the communication network 121 and a communication I/F for communicating with apparatuses, sensors, and the like inside and outside the vehicle via wired communication or wireless communication. FIG. 1 illustrates, as functional components of the integrated control unit 133, a microcomputer 151, a general-purpose communication I/F 152, a dedicated communication I/F 153, a positioning portion 154, a beacon receiving portion 155, an on-board device I/F 156, an audio/video output portion 157, a vehicle-mounted network I/F 158, and a storage portion 159. The other control units similarly include a microcomputer, a communication I/F, a storage portion, and the like.

The drive system control unit 122 controls operations of apparatuses related to a drive system of the vehicle 101 in accordance with various programs. For example, the drive system control unit 122 functions as a control apparatus of a drive force generation apparatus for generating a drive force of the vehicle 101 such as an internal engine or a drive motor, a control apparatus of a drive force transmission mechanism for transmitting the drive force to wheels, a control apparatus of a steering mechanism for adjusting a steering angle of the vehicle 101, a control apparatus of a braking apparatus that generates a brake force of the vehicle 101, and the like. The drive system control unit 122 may have functions as a control apparatus of an ABS (Antilock Brake System), a control apparatus of ESC (Electronic Stability Control), or the like.

A vehicle state detecting portion 123 is connected to the drive system control unit 122. For example, the vehicle state detecting portion 123 includes at least one of a gyroscope sensor that detects an angular velocity of a rotational motion of a shaft of a vehicle body, an acceleration sensor that detects an acceleration of the vehicle 101, and a sensor for detecting an operation amount of a gas pedal, an operation amount of a brake pedal, a steering angle of a steering wheel, the number of revolutions of an engine, a rotational speed of a wheel, or the like. The drive system control unit 122 performs arithmetic processing using a signal input from the vehicle state detecting portion 123 and controls an internal engine, a drive motor, an electric power steering apparatus, a brake apparatus, or the like.

The body system control unit 124 controls operations of various apparatuses mounted to the vehicle body in accordance with various programs. For example, the body system control unit 124 functions as a control apparatus of a key-less entry system, a smart key system, a power window apparatus, or various lamps such as head lamps, tail lamps, brake lamps, turn indicators, and fog lamps. In this case, radio waves or signals of various switches which are transmitted from a portable device that substitutes as a key may be input to the body system control unit 124. The body system control unit 124 accepts input of the radio waves or signals and controls a door lock apparatus, the power window apparatus, the lamps, and the like of the vehicle 101.

It should be noted that FIG. 1 only illustrates a lighting portion 125 as a control target of the body system control unit 124. The lighting portion 125 includes at least a part of the various lamps described above.

The battery control unit 126 controls a secondary battery (not illustrated) that is a power supply source of the drive motor in accordance with various programs. For example, information on a battery temperature, a battery output voltage, a battery remaining capacity, or the like is input to the battery control unit 126 from a battery apparatus including the secondary battery. The battery control unit 126 uses these signals to perform arithmetic processing to control temperature regulation of the secondary battery or to control a cooling apparatus or the like included in the battery apparatus.

The external vehicle information detecting unit 127 detects information on an exterior of the vehicle 101. For example, at least one of a photographing portion 128 and an external vehicle information detecting portion 129 is connected to the external vehicle information detecting unit 127. The photographing portion 128 includes at least one of a ToF (Time of Flight) camera, a stereo camera, a monocular camera, an infrared camera, and other cameras. For example, the external vehicle information detecting portion 129 includes at least one of an environmental sensor for detecting present weather or meteorological phenomena and an ambient information detection sensor for detecting other vehicles, obstacles, pedestrians, or the like around the vehicle 101.

For example, the environmental sensor may be at least one of a raindrop sensor that detects rainy weather, a fog sensor that detects fog, a sunshine sensor that detects a degree of sunshine, and a snow sensor that detects snowfall. The ambient information detection sensor may be at least one of an ultrasonic sensor, a radar apparatus, and a LIDAR (Light Detection and Ranging, Laser Imaging Detection and Ranging) apparatus. The photographing portion 128 and the external vehicle information detecting portion 129 may be respectively included as an independent sensor or an independent apparatus or may be included as an apparatus that integrates a plurality of sensors or apparatuses.

The external vehicle information detecting unit 127 causes the photographing portion 128 to photograph an image of the exterior of the vehicle and receives photographed image data. In addition, the external vehicle information detecting unit 127 receives detection information from the external vehicle information detecting portion 129 being connected thereto. When the external vehicle information detecting portion 129 is an ultrasonic sensor, a radar apparatus, or a LIDAR apparatus, the external vehicle information detecting unit 127 causes the external vehicle information detecting portion 129 to transmit ultrasonic waves, electromagnetic waves, or the like and receive information on received reflected waves (hereinafter, referred to as reflected wave information). Based on the reflected wave information, the external vehicle information detecting unit 127 may perform object detection processing or distance detection processing with respect to people, vehicles, obstacles, signs, characters on road surfaces, and the like. Based on the reflected wave information, the external vehicle information detecting unit 127 may perform environmental recognition processing for recognizing rainfall, fog, road surface conditions, or the like. Based on the reflected wave information, the external vehicle information detecting unit 127 may calculate a distance to an object outside of the vehicle.

In addition, based on received image data, the external vehicle information detecting unit 127 may perform image recognition processing or distance detection processing for recognizing people, vehicles, obstacles, signs, characters on road surfaces, and the like. The external vehicle information detecting unit 127 may perform processing such as distortion correction or positioning with respect to the received image data and composite the image data photographed by different photographing portions 128 to generate a bird's-eye view image or a panoramic image. The external vehicle information detecting unit 127 may perform viewpoint transformation processing using image data photographed by different photographing portions 128.

The internal vehicle information detecting unit 130 detects information on an interior of the vehicle. For example, a driver state detecting portion 131 that detects a state of a driver is connected to the internal vehicle information detecting unit 130. The driver state detecting portion 131 may include a camera that photographs the driver, a biometric sensor that detects biological information of the driver, a microphone that collects sound inside the cabin, or the like. For example, the biometric sensor is provided on a seat surface, the steering wheel, or the like, and detects biological information of a passenger sitting on the seat or the driver holding the steering wheel. Based on detection information input from the driver state detecting portion 131, the internal vehicle information detecting unit 130 may calculate a degree of fatigue or a degree of concentration of the driver or may determine whether or not the driver has fallen asleep. The internal vehicle information detecting unit 130 may perform processing such as noise cancellation processing with respect to a collected sound signal.

The integrated control unit 133 controls overall operations in the vehicle control system 111 in accordance with various programs. An input portion 132 is connected to the integrated control unit 133. The input portion 132 is realized by an apparatus on which a passenger can perform input operations such as a touch panel, a button, a microphone, a switch, or a lever. Data obtained by subjecting sound input from the microphone to speech recognition may be input to the integrated control unit 133. For example, the input portion 132 may be a remote-controlled apparatus using infrared light or other radio waves or an externally-connected device such as a mobile phone or a PDA (Personal Digital Assistant) that accommodates operations of the vehicle control system 111. For example, the input portion 132 may be a camera, in which case a passenger can input information by gesturing to the camera. Alternatively, data obtained by detecting a motion of a wearable apparatus being worn by a passenger may be input. Furthermore, for example, the input portion 132 described above may include an input control circuit or the like which generates an input signal based on information input by a passenger or the like using the input portion 132 and which outputs the generated input signal to the integrated control unit 133. By operating the input portion 132, a passenger or the like inputs various types of data and issues instructions to perform processing operations with respect to the vehicle control system 111.

The storage portion 159 may include a ROM (Read Only Memory) that stores various programs to be executed by the microcomputer 151 and a RAM (Random Access Memory) that stores various parameters, calculation results, sensor values, or the like. In addition, the storage portion 159 may be realized by a magnetic storage device such as an HDD (Hard Disk Drive), a semiconductor storage device, an optical storage device, a magneto-optical storage device, or the like and may provide the various programs to be executed by the microcomputer 151.

The general-purpose communication IF 152 is a general-purpose communication IF that mediates communication with various devices that are present in an external environment 102. The general-purpose communication I/F 152 may implement a cellular communication protocol such as GSM (registered trademark) (Global System of Mobile communications), WiMAX, LTE (Long Term Evolution), or LTE-A (LTE-Advanced) or another wireless communication protocol such as wireless LAN (also referred to as Wi-Fi (registered trademark)) or Bluetooth (registered trademark). For example, the general-purpose communication I/F 152 may connect to a device (for example, an application server or a control server) present on an external network (for example, the Internet, a cloud network, or a company-specific network) via a base station or an access point. In addition, for example, the general-purpose communication IF 152 may connect to a terminal (for example, a terminal belonging to the driver or a pedestrian, a terminal of a store, or an MTC (Machine Type Communication) terminal) that is present in a vicinity of the vehicle 101 using P2P (Peer To Peer) technology.

For example, the various programs to be executed by the microcomputer 151 may be provided from the external environment 102.

The dedicated communication I/F 153 is a communication I/F that supports a communication protocol designed to be used in the vehicle 101. For example, the dedicated communication I/F 153 may implement a standard protocol such as WAVE (Wireless Access in Vehicle Environment) that is a combination of IEEE 802.11p constituting a lower layer and IEEE 1609 constituting a higher layer, DSRC (Dedicated Short Range Communications), or a cellular communication protocol. Typically, the dedicated communication I/F 153 carries out V2X communication that is a concept including one or more of communication between vehicles (Vehicle to Vehicle communication), communication between a road and the vehicle (Vehicle to Infrastructure communication), communication between the vehicle 101 and a home (Vehicle to Home communication), and communication between a pedestrian and the vehicle (Vehicle to Pedestrian communication).

For example, the positioning portion 154 receives a GNSS (Global Navigation Satellite System) signal from a GNSS satellite (for example, a GPS (Global Positioning System) signal from a GPS satellite) and executes positioning, and generates positional information including a latitude, a longitude, and an elevation of the vehicle 101. Alternatively, the positioning portion 154 may specify a current position by exchanging signals with a wireless access point or acquire positional information from a terminal such as a mobile phone, a PHS, or a smartphone with a positioning function.

For example, the beacon receiving portion 155 receives radio waves or electromagnetic waves emitted from a radio station or the like installed on a road and acquires information such as a current position, congestions, closures, and required time. Alternatively, the function of the beacon receiving portion 155 may be included in the dedicated communication I/F 153 described above.

The on-board device I/F 156 is a communication interface that mediates connections between the microcomputer 151 and various on-board devices 134 that are present inside the vehicle. The on-board device I/F 156 may establish a wireless connection using a wireless communication protocol such as a wireless LAN, Bluetooth (registered trademark), NFC (Near Field Communication), or WUSB (Wireless USB). In addition, the on-board device I/F 156 may establish, via a connection terminal (not illustrated) (and a cable when necessary), a wired connection such as USB (Universal Serial Bus), HDMI (registered trademark) (High-Definition Multimedia Interface), or MHL (Mobile High-definition Link). For example, the on-board devices 134 may include at least one of a mobile device or a wearable device that is held or worn by a passenger and an information device to be carried onto or attached to the vehicle 101. Furthermore, the on-board devices 134 may include a navigation apparatus that searches a route to an arbitrary destination. The on-board device I/F 156 exchanges control signals and data signals with the on-board devices 134.

The vehicle-mounted network I/F 158 is an interface that mediates communication between the microcomputer 151 and the communication network 121. The vehicle-mounted network I/F 158 transmits and receives signals and the like in accordance with a prescribed protocol that is supported by the communication network 121.

The microcomputer 151 of the integrated control unit 133 controls the vehicle control system 111 in accordance with various programs based on information acquired via at least one of the general-purpose communication I/F 152, the dedicated communication I/F 153, the positioning portion 154, the beacon receiving portion 155, the on-board device I/F 156, and the vehicle-mounted network I/F 158. For example, based on acquired information on the exterior and the interior of the vehicle, the microcomputer 151 may calculate a control target value of the drive force generation apparatus, the steering mechanism, or the brake apparatus and output a control command to the drive system control unit 122. For example, the microcomputer 151 may perform cooperative control for the purpose of realizing functions of an ADAS (Advanced Driver Assistance System) including collision avoidance or crash mitigation of the vehicle 101, headway control based on inter-vehicular distance, cruise control, a collision warning of the vehicle 101, and a lane departure warning of the vehicle 101. In addition, by controlling the drive force generation apparatus, the steering mechanism, the brake apparatus, or the like based on acquired information on the surroundings of the vehicle 101, the microcomputer 151 may perform cooperative control for the purpose of automated driving or the like that enables the vehicle to travel autonomously without having to rely on operations by the driver.

The microcomputer 151 may generate three-dimensional distance information between the vehicle 101 and a surrounding object such as a structure or a person and create local map information including peripheral information of a current position of the vehicle 101 based on information acquired via at least one of the general-purpose communication I/F 152, the dedicated communication I/F 153, the positioning portion 154, the beacon receiving portion 155, the on-board device I/F 156, and the vehicle-mounted network I/F 158. In addition, based on acquired information, the microcomputer 151 may predict danger such as a collision involving the vehicle 101, an approach by a pedestrian or the like, or entering a closed road and generate a warning signal. For example, the warning signal may be a signal for generating a warning sound or turning on a warning lamp.

The audio/video output portion 157 transmits an output signal of at least one of sound and an image to an output apparatus that is capable of audibly or visually notifying information to a passenger of the vehicle 101 or to the outside of the vehicle 101. In an example shown in FIG. 1, an audio speaker 135, a display portion 136, and an instrument panel 137 are exemplified as output apparatuses. For example, the display portion 136 may include at least one of an on-board display and a head-up display. The display portion 136 may have an AR (Augmented Reality) display function. The output apparatus may be an apparatus other than those described above such as headphones, a wearable device such as a spectacle-type display that is worn by a passenger a projector, or a lamp. When the output apparatus is a display apparatus, the display apparatus displays, in various formats such as a text, an image, a table, and a graph, results obtained by various types of processing performed by the microcomputer 151 and information received from other control units. In addition, when the output apparatus is an audio output apparatus, the audio output apparatus converts an audio signal constituted by reproduced speech data, acoustic data, or the like into an analog signal and auditorially outputs the converted analog signal.

In the example shown in FIG. 1, at least two control units connected via the communication network 121 may be integrated as a single control unit. Alternatively, each control unit may be constituted by a plurality of control units. Furthermore, the vehicle control system 111 may include other control units that are not illustrated. In addition, a part of or all of the functions assumed by any control unit in the description provided above may be shouldered by another control unit. In other words, when information is to be transmitted and received via the communication network 121, prescribed arithmetic processing may be performed by any control unit. In a similar manner, a sensor or an apparatus connected to any control unit may be connected to another control unit and, at the same time, a plurality of control units may mutually transmit and receive detection information via the communication network 121.

Hereinafter, a description of the communication network 121 when a control unit performs communication via the communication network 121 will be omitted. For example, when the drive system control unit 122 and the integrated control unit 133 perform communication via the communication network 121, a simple description of "the drive system control unit 122 and the integrated control unit 133 perform communication" will be used.

In addition, hereinafter, a description of the vehicle-mounted network I/F 158 and the communication network 121 when the microcomputer 151 of the integrated control unit 133 performs communication via the vehicle-mounted network I/F 158 and the communication network 121 will be omitted. For example, when the microcomputer 151 performs communication with the drive system control unit 122 via the vehicle-mounted network I/F 158 and the communication network 121, a simple description of "the microcomputer 151 performs communication with the drive system control unit 122" will be used.

<Configuration Example of Lighting Portion 125>

Figure 2:
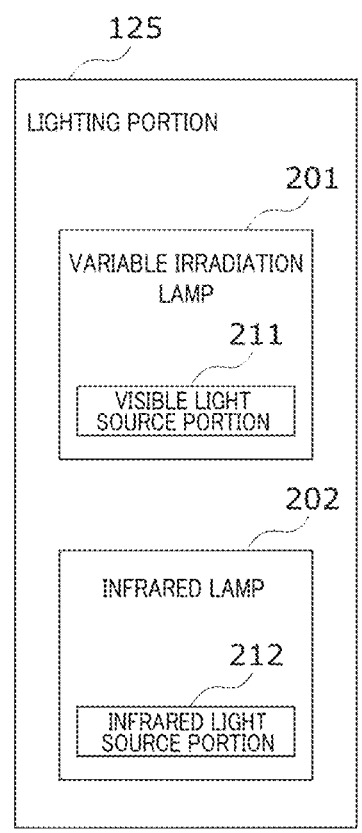
FIG. 2 is a block diagram showing a configuration example of a lighting portion.

FIG. 2 is a block diagram showing a part of a configuration example of the lighting portion 125 shown in FIG. 1.

The lighting portion 125 includes a variable irradiation lamp 201 and an infrared lamp 202.

The variable irradiation lamp 201 includes a visible light source portion 211 that emits visible light and is installed at a position where the front of the vehicle 101 can be irradiated with visible light. In addition, the variable irradiation lamp 201 irradiates the front of the vehicle 101 with visible light under the control of the body system control unit 124.

In addition, the variable irradiation lamp 201 is capable of controlling light intensity for each unit area created by dividing an irradiation area of visible light in plurality, and controls an irradiation pattern by controlling the light intensity for each unit area. Therefore, the irradiation pattern indicates a distribution of light intensity in a spatial direction of visible light emitted from the variable irradiation lamp 201 or, more specifically, a distribution of light intensity for each unit area of visible light.

For example, the visible light source portion 211 has a configuration in which a plurality of light sources (for example, LEDs) are arranged in an array. In addition, the irradiation pattern of visible light is controlled by individually controlling light intensity of each light source of the visible light source portion 211. Controlling the light intensity of each light source includes setting the light intensity to 0 or, in other words, turning off the light source.

Alternatively, for example, the visible light source portion 211 includes a light source, a DMD (Digital Mirror Device), a lens, and the like. In addition, the irradiation pattern of visible light is controlled by controlling on/off states of each mirror of the DMD of the visible light source portion 211.

It should be noted that all of the unit areas need not necessarily have a same shape and a same size and unit areas with a different shape or a different size may be included.

The infrared lamp 202 includes an infrared light source portion 221 that emits infrared light and is installed at a position where the front of the vehicle 101 can be irradiated with infrared light. In addition, the infrared lamp 202 irradiates the front of the vehicle 101 with infrared light under the control of the body system control unit 124.

<Configuration Example of Photographing Portion 128>

Figure 3:
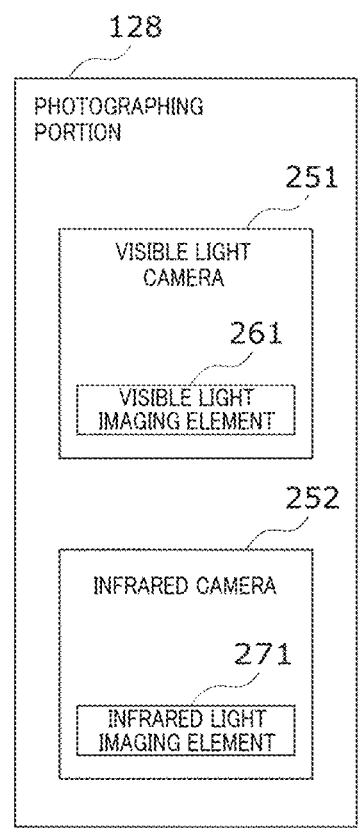
FIG. 3 is a block diagram showing a configuration example of a photographing portion.

FIG. 3 is a block diagram showing a configuration example of the photographing portion 128 shown in FIG. 1.

The photographing portion 128 includes a visible light camera 251 and an infrared camera 252.

The visible light camera 251 includes a visible light imaging element 261 having sensitivity with respect to visible light and is installed at a position where the front of the vehicle 101 can be photographed. For example, the visible light camera 251 is installed inside a headlamp, on top of a dashboard, above a rear view mirror inside a cabin, on top of a roof, or the like of the vehicle 101. In addition, the visible light camera 251 photographs the front of the vehicle 101 under the control of the external vehicle information detecting unit 127 and supplies the external vehicle information detecting unit 127 with data of a color image (hereinafter, referred to as a visible image) obtained as a result of the photography.

The variable irradiation lamp 201 described above irradiates visible light in a photographing direction of the visible light camera 251 (the visible light imaging element 261) and is at least capable of irradiating visible light roughly evenly within an angle of view of the visible light camera 251.

The infrared camera 252 includes an infrared light imaging element 271 having sensitivity with respect to infrared rays (infrared light) and is installed at a position where the front of the vehicle 101 can be photographed. For example, the infrared camera 252 is installed at a position similar to that of the visible light camera 251. In addition, the infrared camera 252 photographs the front of the vehicle 101 under the control of the external vehicle information detecting unit 127 and supplies the external vehicle information detecting unit 127 with data of a black and white image (hereinafter, referred to as an infrared image) obtained as a result of the photography.

The infrared lamp 202 described above irradiates infrared light in a photographing direction of the infrared camera 252 (the infrared light imaging element 271) and is at least capable of irradiating infrared light roughly evenly within an angle of view of the infrared camera 252.

<Configuration Example of Information Processing Portion 301>

Figure 4:
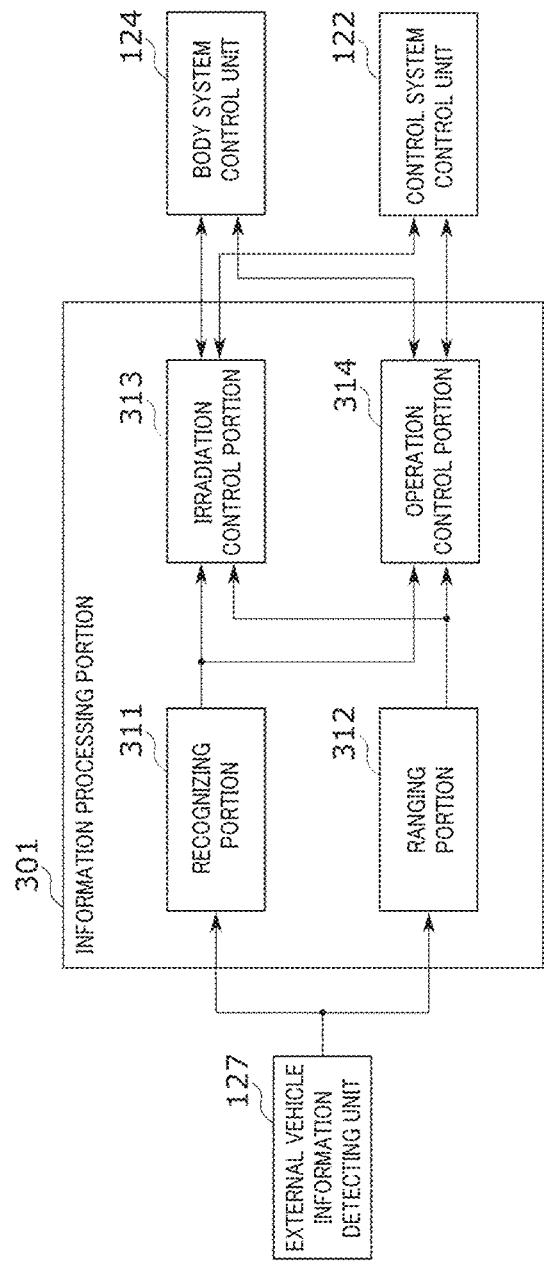
FIG. 4 is a block diagram showing a configuration example of an information processing portion.

FIG. 4 shows a configuration example of the information processing portion 301 which is a part of functions realized as the microcomputer 151 of the integrated control unit 133 executes a prescribed control program. In the drawing, illustration of the communication network 121 and the vehicle-mounted network I/F 158 among the drive system control unit 122, the body system control unit 124, the external vehicle information detecting unit 127, and the information processing portion 301 has been omitted.

The information processing portion 301 includes a recognizing portion 311, a ranging portion 312, an irradiation control portion 313, and an operation control portion 314.

The recognizing portion 311 acquires data of a visible image and an infrared image from the external vehicle information detecting unit 127 and performs image recognition processing with respect to the visible image and the infrared image. In this case, image recognition processing refers to, for example, processing for recognizing an object in an image. In addition, the recognizing portion 311 calculates, for each area (hereinafter, referred to as a recognized area) based on a recognition result of an object by the image recognition processing, a recognition score that indicates a reliability of the recognition result.

The recognized area is, for example, an area corresponding to each recognized object. However, the recognized area may also include an area in which recognition of an object has failed. In addition, for example, the recognition score indicates a reliability of a recognition result of an object in the recognized area or, in other words, a certainty of an object having been recognized in the recognized area.

The recognizing portion 311 supplies the irradiation control portion 313 and the operation control portion 314 with recognition information including a position of each recognized area, a type of object in each recognized area, and a recognition score.

The ranging portion 312 performs detection processing of a distance to an object in front of the vehicle 101 based on image data of a stereo camera, image data of a ToF camera, or reflected wave information of an ultrasonic sensor, a radar apparatus, or a LIDAR apparatus which is supplied from the external vehicle information detecting unit 127. The ranging portion 312 supplies the irradiation control portion 313 and the operation control portion 314 with ranging information including a detection result of a distance to each object.

The irradiation control portion 313 controls irradiation of visible light and infrared light by the lighting portion 125 based on a recognition result of an object in front of the vehicle 101, a detection result of a distance to the object in front of the vehicle 101, a detection result of a speed of the vehicle 101 notified from the drive system control unit 122, and the like.

For example, the irradiation control portion 313 generates a control signal (hereinafter, referred to as a visible light control signal) that includes an irradiation pattern of the variable irradiation lamp 201 and supplies the body system control unit 124 with the visible light control signal. The body system control unit 124 controls the irradiation pattern of the variable irradiation lamp 201 based on the visible light control signal.

In addition, for example, the irradiation control portion 313 generates a control signal (hereinafter, referred to as an infrared light control signal) that controls irradiation of infrared light by the infrared lamp 202 and supplies the body system control unit 124 with the infrared light control signal. The body system control unit 124 controls irradiation of infrared light by the infrared lamp 202 based on the infrared light control signal.

The operation control portion 314 controls operations of apparatuses related to a drive system of the vehicle 101 based on a recognition result of an object in front of the vehicle 101, a detection result of a distance to the object in front of the vehicle 101, and the like. For example, the operation control portion 314 generates a control signal (hereinafter, referred to as a drive system control signal) that includes control contents of an apparatus to be a control target and supplies the drive system control unit 122 with the drive system control signal. The drive system control unit 122 controls operations of the apparatus to be a control target based on the drive system control signal.

In addition, the operation control portion 314 controls operations of various apparatuses mounted to the body of the vehicle 101 based on the recognition result of an object in front of the vehicle 101, the detection result of a distance to the object in front of the vehicle 101, and the like. For example, the operation control portion 314 generates a control signal (hereinafter, referred to as a body system control signal) that includes control contents of an apparatus to be a control target and supplies the body system control unit 124 with the body system control signal. The body system control unit 124 controls operations of the apparatus to be a control target based on the body system control signal.

<Lighting Control Processing>

Figure 5:
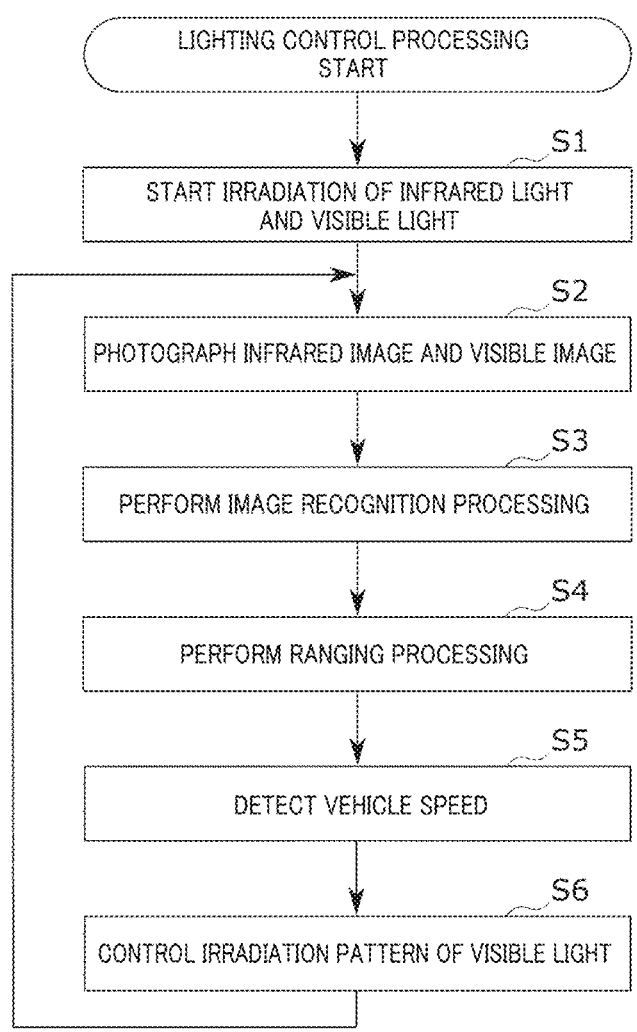
FIG. 5 is a flow chart for explaining lighting control processing.

Next, lighting control processing to be executed by the vehicle 101 will be described with reference to the flow chart shown in FIG. 5.

The processing is started when, for example, conditions to start irradiation of visible light are satisfied such as when surrounding brightness falls below a prescribed threshold during start-up of the vehicle 101 or when a switch of the variable irradiation lamp 201 is switched on. In addition, the processing is ended when, for example, conditions to end irradiation of visible light are satisfied such as when a power source of the vehicle 101 is turned off, when surrounding brightness of the vehicle 101 equals or exceeds the prescribed threshold, or when a switch of the variable irradiation lamp 201 is switched off.

In step S1, the vehicle control system 111 starts irradiation of infrared light and visible light.

Specifically for example, the irradiation control portion 313 generates an infrared light control signal for control so that infrared light is irradiated at prescribed light intensity and supplies the body system control unit 124 with the generated infrared light control signal. The body system control unit 124 controls the infrared lamp 202 so as to irradiate infrared light at the prescribed light intensity based on the infrared light control signal. Accordingly, the front of the vehicle 101 is irradiated with infrared light with the prescribed light intensity.

With infrared light, since dazzle by passerby, drivers of other vehicles, and the like is not a concern, light intensity can be increased as much as possible within a range in which saturation of pixels in an infrared image does not occur.

In addition, for example, the irradiation control portion 313 generates a visible light control signal for control so that visible light is irradiated in a standard irradiation pattern and supplies the body system control unit 124 with the generated visible light control signal. The body system control unit 124 controls the variable irradiation lamp 201 so as to irradiate visible light in the standard irradiation pattern based on the visible light control signal. Accordingly the front of the vehicle 101 is irradiated with visible light in a standard pattern.

In this case, a standard irradiation pattern is, for example, a pattern in which light intensity of all unit areas is set to a same initial value.

In step S2, the photographing portion 128 photographs an infrared image and a visible image. Specifically, the infrared camera 252 photographs the front of the vehicle 101 and supplies the recognizing portion 311 and the ranging portion 312 with data of an infrared image obtained as a result of the photography via the external vehicle information detecting unit 127. In addition, the visible light camera 251 photographs the front of the vehicle 101 and supplies the recognizing portion 311 and the ranging portion 312 with data of a visible image obtained as a result of the photography via the external vehicle information detecting unit 127.

In step S3, the recognizing portion 311 performs image recognition processing. For example, the recognizing portion 311 performs semantic segmentation as the image recognition processing.

Specifically the recognizing portion 311 performs semantic segmentation with respect to an infrared image, performs detection of a type and a position of each object in the infrared image on a pixel level and, based on a recognition result, divides the infrared image into a plurality of recognized areas. In addition, the recognizing portion 311 calculates a recognition score of each recognized area in the infrared image.

Furthermore, the recognizing portion 311 performs semantic segmentation in a similar manner with respect to a visible image, performs detection of a type and a position of each object in the visible image on a pixel level and, based on a recognition result, divides the visible image into a plurality of recognized areas. In addition, the recognizing portion 311 calculates a recognition score of each recognized area in the visible image.

In this case, a recognized area is basically set for each recognized object. Therefore, each recognized area basically includes one object. However, for example, in cases where a boundary line of an object is ambiguous or the like, a plurality of objects may be included in one recognized area. In addition, an area in which recognition of an object has failed may be set as a recognized area. In such cases, an object in the recognized area is unknown.

In addition, an arbitrary method can be used as a calculation method of a recognition score.

Infrared images lack color information and contain more noise than visible images. Therefore, a result of image recognition processing (in the present example, semantic segmentation) with respect to an infrared image has lower reliability than a result of the image recognition processing with respect to a visible image.

The recognizing portion 311 supplies the irradiation control portion 313 and the operation control portion 314 with recognition information including a position of each recognized area, a type of object in each recognized area, and a recognition score.

In step S4, the vehicle control system 111 performs ranging processing. For example, the external vehicle information detecting portion 129 supplies the ranging portion 312 with reflected wave information via the external vehicle information detecting unit 127. Based on the reflected wave information, the ranging portion 312 detects a distance to each object in front of the vehicle 101. The ranging portion 312 supplies the irradiation control portion 313 and the operation control portion 314 with ranging information including a detection result of a distance to each object.

An arbitrary method can be used for the ranging processing. For example, the ranging processing can be performed using image data of a stereo camera, image data of a ToF camera, or the like.

In step S5, the drive system control unit 122 detects a vehicle speed. Specifically, based on a signal input from the vehicle state detecting portion 123, the drive system control unit 122 detects a speed of the vehicle 101 and supplies the irradiation control portion 313 and the operation control portion 314 with information including a detection result.

In step S6, the vehicle control system 111 controls an irradiation pattern of visible light. Specifically, the irradiation control portion 313 sets the irradiation pattern by setting light intensity of each unit area. For example, the irradiation control portion 313 sets the irradiation pattern so as to increase a recognition score of each recognized area of the visible image as much as possible. The irradiation control portion 313 generates a visible light control signal that includes the set irradiation pattern and supplies the body system control unit 124 with the visible light control signal.

The body system control unit 124 controls the irradiation pattern of the variable irradiation lamp 201 based on the visible light control signal.

An example of a setting method of an irradiation pattern will now be described.

For example, the irradiation control portion 313 sets the irradiation pattern based on a result of image recognition processing with respect to an infrared image.

For example, the irradiation control portion 313 sets light intensity of visible light with respect to a recognized area (hereinafter, referred to as a low-reliability area) of which a recognition score in the infrared image is lower than a threshold T1 so that a recognition score of the low-reliability area in a visible image increases. For example, the irradiation control portion 313 increases light intensity of visible light with respect to the low-reliability area (makes the low-reliability area brighter).

On the other hand, the irradiation control portion 313 sets light intensity of visible light with respect to a recognized area of which a recognition score in the infrared image is equal to or higher than the threshold T1 based on, for example, a type of an object in the recognized area.

For example, when a road surface is included in a recognized area, the irradiation control portion 313 controls the light intensity of visible light with respect to the recognized area so that the recognized area is constantly illuminated with light intensity of a certain level or higher.

For example, when a person or another vehicle is included in a recognized area, the irradiation control portion 313 lowers the light intensity of visible light with respect to the recognized area. Accordingly, passerby and drivers of other vehicles are prevented from becoming dazzled. Alternatively, the irradiation control portion 313 may lower the light intensity of visible light to 0 so that visible light is not irradiated in the recognized area.

For example, when an object (for example, a traffic light or a street lamp) that emits light is included in a recognized area, the irradiation control portion 313 lowers the light intensity of visible light with respect to the recognized area. This is because an object that emits light increases accuracy of image recognition processing increases even when not illuminated by visible light. Alternatively, the irradiation control portion 313 may lower the light intensity of visible light to 0 so that visible light is not irradiated in the recognized area.

For example, when an object (for example, a traffic sign) including a reflective member that reflects visible light is included in a recognized area, the irradiation control portion 313 lowers the light intensity of visible light with respect to the recognized area. This is because the recognized area becomes brighter than other areas due to the reflective member reflecting visible light and may become saturated in a visible image. The irradiation control portion 313 lowers the light intensity of visible light with respect to the recognized area to a level at which the recognized area does not become saturated in the visible image.

In addition, for example, the irradiation control portion 313 controls the irradiation pattern based on a result of image recognition processing with respect to a visible image.

For example, when a recognized area (a low-reliability area) of which a recognition score is lower than the threshold T1 in the visible image is present despite controlling the irradiation pattern based on a result of image recognition processing with respect to the infrared image, the irradiation control portion 313 controls light intensity of visible light with which the low-reliability area is to be irradiated based on an average value of brightness of the low-reliability area in the visible image. For example, when the average value of brightness of the low-reliability area is lower than a threshold Th2, the irradiation control portion 313 increases light intensity of visible light with respect to the low-reliability area (makes the low-reliability area brighter). On the other hand, when the average value of brightness of the low-reliability area is equal to or higher than the threshold Th2, the irradiation control portion 313 lowers the light intensity of visible light with respect to the low-reliability area (makes the low-reliability area darker).

Furthermore, for example, the irradiation control portion 313 sets the light intensity of visible light with respect to a recognized area based on a distance to an object in the recognized area. For example, the shorter the distance to an object in the recognized area, the further the irradiation control portion 313 lowers the light intensity of visible light with respect to the recognized area (makes the recognized area darker). On the other hand, the longer the distance to an object in the recognized area, the further the irradiation control portion 313 increases the light intensity of visible light with respect to the recognized area (makes the recognized area brighter).

In addition, for example, when a distance to an object in a recognized area is equal to or greater than a threshold Th3, the irradiation control portion 313 may exclude the recognized area from image recognition processing and set light intensity of irradiated light with which the recognized area is to be irradiated to 0. Accordingly, for example, irradiation of a far object such as the sky with visible light is suspended.

For example, the irradiation control portion 313 may change the threshold Th3 in accordance with a speed of the vehicle 101. For example, the irradiation control portion 313 increases the threshold Th3 as the speed of the vehicle 101 increases so that objects that are farther away are irradiated with visible light. On the other hand, for example, the irradiation control portion 313 reduces the threshold Th3 as the speed of the vehicle 101 decreases so that objects that are farther away are not irradiated with visible light. This is because, when the speed of the vehicle 101 is high, farther objects must be monitored for collision prevention and the like, but when the speed of the vehicle 101 is low, there is not such a need for monitoring farther objects.

Specific examples of a control method of an irradiation pattern will now be described with reference to FIGS. 6 to 8.

Figure 6:
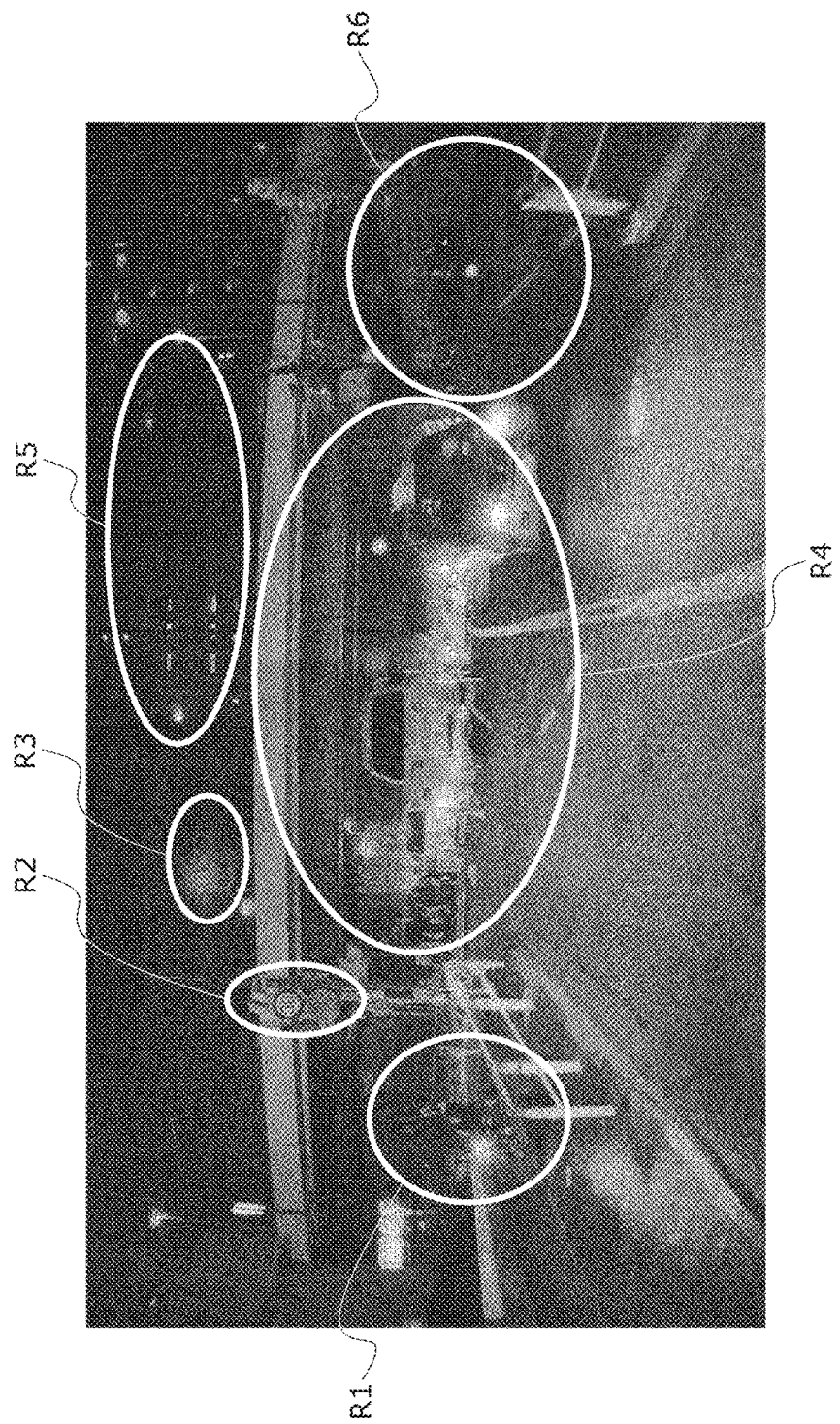
FIG. 6 is a diagram for explaining a control method of an irradiation pattern.

FIG. 6 shows an example of a photographed infrared image of the front of the vehicle 101.

A recognized area R1 is an area that includes a person riding a bicycle. For example, when a recognition score of the recognized area R1 is equal to or higher than a threshold Th1, light intensity of visible light with respect to the recognized area R1 is reduced. On the other hand, when the recognition score of the recognized area R1 is lower than the threshold Th1, the light intensity of visible light with respect to the recognized area R1 is increased. In addition, the light intensity of visible light with respect to the recognized area R1 is changed in accordance with, for example, a distance to the person inside the area.

A recognized area R2 is an area that includes a traffic sign with a reflective plate. For example, light intensity of visible light with respect to the recognized area R2 is reduced. In addition, the light intensity of visible light with respect to the recognized area R2 is changed in accordance with, for example, a distance to the traffic sign inside the area.

A recognized area R3 is an area that includes a traffic light that emits light. For example, light intensity of visible light with respect to the recognized area R3 is reduced. In addition, the light intensity of visible light with respect to the recognized area R3 is changed in accordance with, for example, a distance to the traffic light inside the area.

A recognized area R4 is an area that includes another vehicle. For example, when a recognition score of the recognized area R4 is equal to or higher than the threshold Th1, light intensity of visible light with respect to the recognized area R4 is reduced. On the other hand, when the recognition score of the recognized area R4 is lower than the threshold Th1, the light intensity of visible light with respect to the recognized area R4 is increased. In addition, the light intensity of visible light with respect to the recognized area R4 is changed in accordance with, for example, a distance to the vehicle inside the area.

A recognized area R5 is an area that includes a distant building and the sky. For example, light intensity of visible light with respect to the recognized area R5 is set to 0.

The recognized area R6 is an extremely dark area which is close to the vehicle 101 and of which a recognition score is extremely low. For example, light intensity of visible light with respect to the recognized area R6 is increased in order to improve the recognition score.

Figure 7:
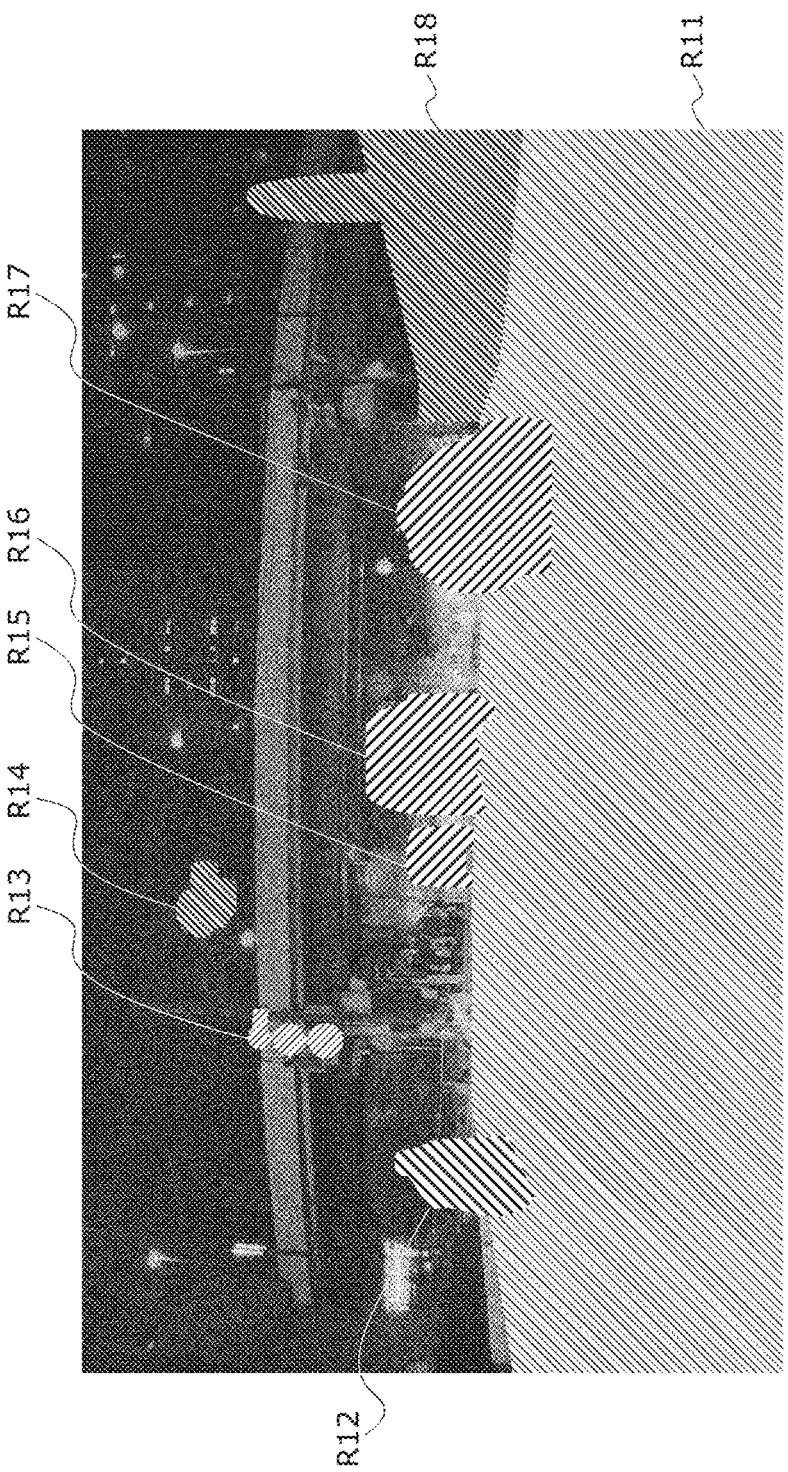
FIG. 7 is a diagram for explaining a control method of an irradiation pattern.

FIG. 7 shows an example of a result of semantic segmentation performed with respect to a visible image with a same angle of view as in FIG. 6.

A road surface is present in a recognized area R11. Therefore, control is performed so that the recognized area R11 is constantly irradiated with visible light. Light intensity of visible light with respect to the recognized area R11 is changed in accordance with, for example, a distance to the road surface inside the area.

A recognized area R12 is an area that includes a person riding a bicycle. For example, when a recognition score of the recognized area R12 is equal to or higher than the threshold Th1, light intensity of visible light with respect to the recognized area R12 is reduced. On the other hand, when the recognition score of the recognized area R12 is lower than the threshold Th1, the light intensity of visible light with respect to the recognized area R12 is increased. In addition, the light intensity of visible light with respect to the recognized area R12 is changed in accordance with, for example, a distance to the person inside the area.

A recognized area R13 is an area that includes a traffic sign. For example, light intensity of visible light with respect to the recognized area R13 is reduced. In addition, the light intensity of visible light with respect to the recognized area R13 is changed in accordance with, for example, a distance to the traffic sign inside the area.

A recognized area R14 is an area that includes a traffic light. For example, light intensity of visible light with respect to the recognized area R14 is reduced. In addition, the light intensity of visible light with respect to the recognized area R14 is changed in accordance with, for example, a distance to the traffic light inside the area.

Recognized areas R15 to R17 are areas that include another vehicle. For example, light intensity of visible light is reduced with respect to an area with a recognition score that is equal to or higher than the threshold Th1 among the recognized areas R15 to R17. On the other hand, light intensity of visible light is increased with respect to an area with a recognition score that is lower than the threshold Th1 among the recognized areas R15 to R17. In addition, the light intensity of visible light with respect to the recognized areas R15 to R17 is changed in accordance with, for example, a distance to the vehicle inside the areas.

The recognized area R18 is an extremely dark area which is close to the vehicle 101 and of which a recognition score is extremely low. For example, light intensity of visible light with respect to the recognized area R18 is increased in order to improve the recognition score.

FIG. 8 shows another example of a photographed infrared image of the front of the vehicle 101.

The recognized area R21 is an extremely dark area which is close to the vehicle 101 and of which a recognition score is extremely low. For example, light intensity of visible light with respect to the recognized area R21 is increased in order to improve the recognition score.

Recognized areas R22 and R23 are areas that include a person. For example, light intensity of visible light is reduced with respect to an area with a recognition score that is equal to or higher than the threshold Th1 among the recognized areas R22 and R23. On the other hand, light intensity of visible light is increased with respect to an area with a recognition score that is lower than the threshold Th1 among the recognized areas R22 and R23. In addition, the light intensity of visible light with respect to the recognized areas R22 and R23 is changed in accordance with, for example, a distance to the person inside the areas.

Returning to FIG. 5, the processing subsequently returns to step S2 and processing of step S2 and thereafter is executed.

As described above, by appropriately controlling an irradiation pattern of visible light, accuracy of image recognition processing with respect to a visible image improves. As a result, for example, recognition accuracy of an object in the visible image improves and, in turn, performance of functions (for example, automatic driving, ADAS, and the like) of the vehicle 101 using the recognition result improves.

2. Modifications

Hereinafter, modifications of the embodiment of the present technique described above will be described.

While an example in which semantic segmentation is used as image recognition processing has been presented in the description given above, the present technique can also be applied when using other methods of image recognition processing.

In addition, for example, the present technique can also be applied when image recognition processing is performed using only a visible image. In this case, for example, an irradiation pattern is controlled based on a recognition score of each recognized area of the visible image, a type of an object, and a distance to the object according to a similar method to a case where a result of image recognition processing with respect to an infrared image is used.

Furthermore, in the control processing of an irradiation pattern described above, recognized areas may be created in which light intensity of visible light is reduced or set to 0. This is not particularly problematic in a case of automatic driving that does not involve a driver. On the other hand, when a driver is driving, visibility of the driver may deteriorate. Therefore, when a driver is driving, an irradiation pattern may be controlled by the method described above only during a period in which image recognition processing is performed, and the front of the vehicle 101 may be uniformly illuminated with visible light during a period in which image recognition processing is not performed.

In addition, while an example in which image recognition processing is performed with respect to an image of the front of the vehicle 101 has been presented in the description given above, the present technique can also be applied when performing image recognition processing with respect to an image in a direction other than the front (for example, the side, the rear, above, or the like). In this case, for example, an irradiation pattern of visible light in a photographing direction of each image is controlled.

Furthermore, the present technique can also be applied to a mobile body other than a vehicle. For example, the present technique can also be applied to mobile bodies such as personal mobility, construction machinery, and agricultural and farm machinery (tractors). In addition, the present technique can also be applied to mobile bodies that are remotely operated (manipulated) without carrying a user such as a drone and a robot as well as mobile bodies that are capable of automatic driving.

In addition, the present technique can also be applied when image recognition processing is performed with respect to an image other than an image photographed from a mobile body. For example, the present technique can also be applied when image recognition processing is performed with respect to a monitoring image photographed by a camera installed in a periphery of a road.

Furthermore, all of the information processing portion 301 shown in FIG. 4 need not necessarily be realized by the integrated control unit 133 and a part of or all of the information processing portion 301 may be realized by one or more other control units.

In addition, a part of or all of the information processing portion 301 may be provided in, for example, the variable irradiation lamp 201 or the visible light camera 251.

3. Other

The series of processing described above can be executed by hardware or by software.

The program to be executed by the microcomputer 151 shown in FIG. 1 or the like may be a program which causes processing to be time-sequentially performed along an order described in the present specification or a program which causes processing to be performed in parallel or at necessary timings such as when a call is made.

In addition, in the present specification, a system signifies a set of a plurality of components (apparatuses, modules (parts), and the like), and whether or not all of the components are present inside a same casing does not matter. Therefore, a plurality of apparatuses which are housed in separate casings but which are connected to each other via a network and a single apparatus in which a plurality of modules are housed in a single casing are both considered systems.

Furthermore, embodiments of the present technique are not limited to the embodiment described above and various modifications can be made without departing from the gist of the present technique.

For example, the present technique may adopt a configuration of cloud computing in which a single function is shared among and cooperatively processed by a plurality of apparatuses via a network.

In addition, each step explained in the flow charts described above can be executed in a shared manner by a plurality of apparatuses in addition to being executed by a single apparatus.

Furthermore, when a single step includes a plurality of processing steps, the plurality of processing steps included in the single step can be executed in a shared manner by a plurality of apparatuses in addition to being executed by a single apparatus.

Examples of Configuration Combinations

The present technique can also be configured as follows.

(1)

An information processing apparatus, including:
a recognizing portion configured to perform image recognition processing with respect to an image photographed by a photographing portion and calculate, for each recognized area being an area based on a recognition result of an object, a reliability of the recognition result; and
an irradiation control portion configured to control an irradiation pattern of visible light in a photographing direction of the photographing portion so that the reliability with respect to at least a part of the recognized areas increases.

(2)

The information processing apparatus according to (1), wherein
the irradiation control portion is configured to control light intensity of visible light with respect to a low-reliability area that is the recognized area of which the reliability is lower than a prescribed threshold so that the reliability with respect to the low-reliability area increases.

(3)

The information processing apparatus according to (2), wherein
the irradiation control portion is configured to control light intensity of visible light with respect to the low-reliability area based on brightness of the low-reliability area in the image.

(4)

The information processing apparatus according to any one of (1) to (3), wherein
the irradiation control portion is configured to further control the irradiation pattern based on a type of an object in the recognized area.

(5)

The information processing apparatus according to (4), wherein
the irradiation control portion is configured to lower light intensity of visible light with respect to the recognized area including an object that emits light and a reflective member that reflects visible light.

(6)

The information processing apparatus according to any one of (1) to (5), wherein
the irradiation control portion is configured to further control the irradiation pattern based on a distance to an object in the recognized area.

(7)

The information processing apparatus according to (6), wherein
the irradiation control portion is configured to lower light intensity of visible light with respect to the recognized area including an object that is separated by a prescribed distance or more.

(8)

The information processing apparatus according to any one of (1) to (7), wherein
the image includes an infrared image and a visible image, and
the irradiation control portion is configured to control the irradiation pattern based on the reliability of image recognition processing with respect to the infrared image.

(9)

The information processing apparatus according to (8), wherein
the irradiation control portion is configured to further control the irradiation pattern based on the reliability of image recognition processing with respect to the visible image.

(10)

The information processing apparatus according to any one of (1) to (9), wherein
the image is an image obtained by photographing the surroundings of a mobile body.

(11)

The information processing apparatus according to (10), wherein
the mobile body is a vehicle, and the irradiation control portion is configured to control the irradiation pattern so as to irradiate the recognized area including a road surface with visible light.

(12)

The information processing apparatus according to (10) or (11), wherein
the mobile body is a vehicle, and
the irradiation control portion is configured to lower light intensity of visible light with respect to the recognized area including a person or another vehicle.

(13)

The information processing apparatus according to any one of (1) to (12), wherein
the irradiation control portion is configured to control the irradiation pattern by controlling light intensity of visible light in prescribed area units.

(14)

The information processing apparatus according to any one of (1) to (13), wherein
the irradiation pattern is a distribution of light intensity of visible light in a spatial direction.

(15)

The information processing apparatus according to any one of (1) to (14), wherein
the irradiation control portion is configured to output a control signal including
the irradiation pattern.

(16)

The information processing apparatus according to any one of (1) to (15), wherein
the recognizing portion is configured to perform semantic segmentation as image recognition processing.

(17)

An information processing method, including:
performing image recognition processing with respect to an image photographed by a photographing portion and calculating, for each recognized area being an area based on a recognition result of an object, a reliability of the recognition result; and
controlling an irradiation pattern of visible light in a photographing direction of the photographing portion so that the reliability with respect to at least a part of the recognized areas increases.

(18)

A photographing apparatus, including:
an imaging element;
a recognizing portion configured to perform image recognition processing with respect to an image photographed by the imaging element and calculate, for each recognized area being an area based on a recognition result of an object, a reliability of the recognition result; and an irradiation control portion configured to control an irradiation pattern of visible light in a photographing direction of the imaging element so that the reliability with respect to at least a part of the recognized areas increases.

(19)

A lighting apparatus, including a light source portion;

a recognizing portion configured to perform image recognition processing with respect to an image photographed by a photographing portion and calculate, for each recognized area being an area based on a recognition result of an object, a reliability of the recognition result; and an irradiation control portion configured to control an irradiation pattern of visible light due to the light source portion in a photographing direction of the photographing portion so that the reliability with respect to at least a part of the recognized areas increases.

(20)

A mobile body, including:

a photographing portion;

a lighting portion configured to irradiate visible light in a photographing direction of the photographing portion;

a recognizing portion configured to perform image recognition processing with respect to an image photographed by the photographing portion and calculate, for each recognized area being an area based on a recognition result of an object, a reliability of the recognition result; and an irradiation control portion configured to control an irradiation pattern of visible light of the lighting portion so that the reliability with respect to at least a part of the recognized areas increases.

It should be noted that the advantageous effects described in the present specification are merely exemplary and are not restrictive, and other advantageous effects may be produced.

REFERENCE SIGNS LIST

101 Vehicle
111 Vehicle control system
122 Drive system control unit
124 Body system control unit
125 Lighting portion
127 External vehicle information detecting unit
128 Photographing portion
129 External vehicle information detecting portion
133 Integrated control unit
151 Microcomputer
201 Variable irradiation lamp
202 Infrared lamp
211 Visible light source portion
212 Infrared light source portion
251 Visible light camera
252 Infrared camera
261 Visible light imaging element
271 Infrared light imaging element
301 Information processing portion
311 Recognizing portion
312 Ranging portion
313 Irradiation control portion
314 Operation control portion

The invention claimed is:

1. An information processing apparatus, comprising:
circuitry configured to
perform image recognition processing with respect to an image photographed by a camera and calculate, for each recognized area being an area based on a recognition result of an object, a reliability of the recognition result, wherein the image comprises an infrared image and a visible image;
control an irradiation pattern of visible light in a photographing direction of the camera so that the reliability with respect to at least a part of the recognized areas increases; and
control the irradiation pattern based on the reliability of the image recognition processing performed with respect to the infrared image.

2. The information processing apparatus according to claim 1, wherein
the circuitry is configured to control light intensity of visible light with respect to a low-reliability area that is the recognized area of which the reliability is lower than a prescribed threshold so that the reliability with respect to the low-reliability area increases.

3. The information processing apparatus according to claim 2, wherein
the circuitry is configured to control light intensity of visible light with respect to the low-reliability area based on brightness of the low-reliability area in the image.

4. The information processing apparatus according to claim 1, wherein
the circuitry is configured to further control the irradiation pattern based on a type of an object in the recognized area.

5. The information processing apparatus according to claim 4, wherein
the circuitry is configured to lower light intensity of visible light with respect to the recognized area including an object that emits light and a reflective member that reflects visible light.

6. The information processing apparatus according to claim 1, wherein
the circuitry is configured to further control the irradiation pattern based on a distance to an object in the recognized area.

7. The information processing apparatus according to claim 6, wherein
the circuitry is configured to set light intensity of visible light with respect to the recognized area including an object that is separated by a prescribed distance or more to 0.

8. The information processing apparatus according to claim 1, wherein
the circuitry is configured to further control the irradiation pattern based on the reliability of the image recognition processing performed with respect to the visible image.

9. The information processing apparatus according to claim 1, wherein
the image is an image obtained by photographing the surroundings of a mobile body.

10. The information processing apparatus according to claim 9, wherein
the mobile body is a vehicle, and
the circuitry is configured to control the irradiation pattern so as to irradiate the recognized area including a road surface with visible light.

11. The information processing apparatus according to claim 9, wherein
the mobile body is a vehicle, and
the circuitry is configured to lower light intensity of visible light with respect to the recognized area including a person or another vehicle.

12. The information processing apparatus according to claim 1, wherein the circuitry is configured to control the irradiation pattern by controlling light intensity of visible light in prescribed area units.

13. The information processing apparatus according to claim 1, wherein
the irradiation pattern is a distribution of light intensity of visible light in a spatial direction.

14. The information processing apparatus according to claim 1, wherein
the circuitry is configured to output a control signal including the irradiation pattern.

15. The information processing apparatus according to claim 1, wherein
the circuitry is configured to perform semantic segmentation as image recognition processing.

16. An information processing method, comprising:
performing image recognition processing with respect to an image photographed by a camera and calculating, for each recognized area being an area based on a recognition result of an object, a reliability of the recognition result, wherein the image comprises an infrared image and a visible image;
controlling an irradiation pattern of visible light in a photographing direction of the camera so that the reliability with respect to at least a part of the recognized areas increases; and
controlling the irradiation pattern based on the reliability of the image recognition processing performed with respect to the infrared image.

17. A photographing apparatus, comprising:
an imaging element;
circuitry configured to
perform image recognition processing with respect to an image photographed by the imaging element and calculate, for each recognized area being an area based on a recognition result of an object, a reliability of the recognition result, wherein the image comprises an infrared image and a visible image;
control an irradiation pattern of visible light in a photographing direction of the imaging element so that the reliability with respect to at least a part of the recognized areas increases; and
control the irradiation pattern based on the reliability of the image recognition processing performed with respect to the infrared image.

18. A lighting apparatus, comprising:
a light source;
circuitry configured to
perform image recognition processing with respect to an image photographed by a camera and calculate, for each recognized area being an area based on a recognition result of an object, a reliability of the recognition result, wherein the image comprises an infrared image and a visible image;
control an irradiation pattern of visible light due to the light source portion in a photographing direction of the camera so that the reliability with respect to at least a part of the recognized areas increases; and
control the irradiation pattern based on the reliability of the image recognition processing performed with respect to the infrared image.

19. A mobile body comprising:
a camera;
light source configured to irradiate visible light in a photographing direction of the camera;
circuitry configured to
perform image recognition processing with respect to an image photographed by the camera and calculate, for each recognized area being an area based on a recognition result of an object, a reliability of the recognition result, wherein the image comprises an infrared image and a visible image;
control an irradiation pattern of visible light of the light source so that the reliability with respect to at least a part of the recognized areas increases; and
control the irradiation pattern based on the reliability of the image recognition processing performed with respect to the infrared image.

* * * * *